Oct. 18, 1932.　　　C. BORNMANN　　　1,883,511
FILM HOLDER FOR CAMERAS
Filed Jan. 4, 1932
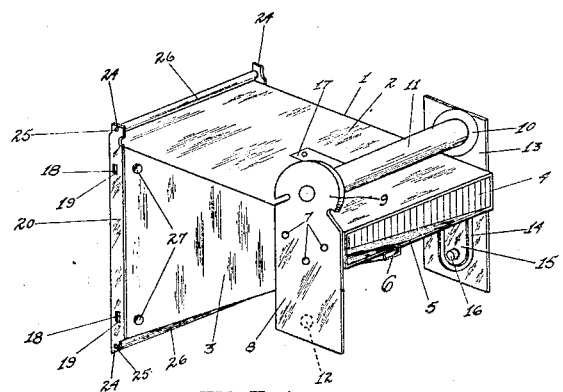
Fig.1.
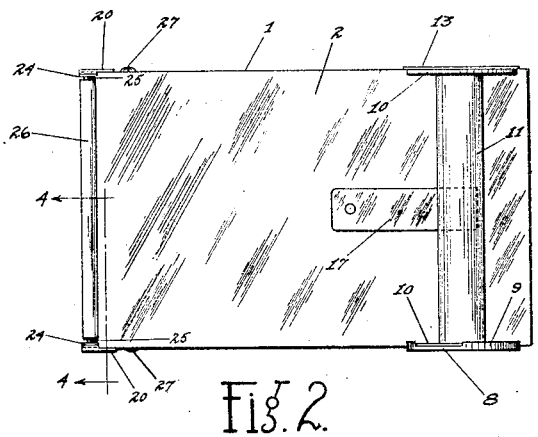
Fig.2.
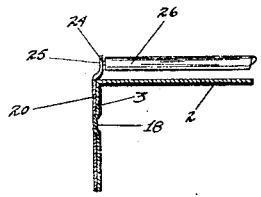
Fig.4.
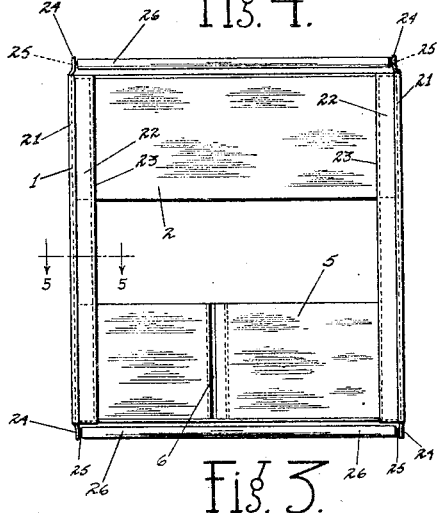
Fig.5.
Fig.3.
INVENTOR.
CARL BORNMANN.
BY Philip S. Hopkins
ATTORNEY.

Patented Oct. 18, 1932

1,883,511

UNITED STATES PATENT OFFICE

CARL BORNMANN, OF BINGHAMTON, NEW YORK, ASSIGNOR TO AGFA ANSCO CORPORATION, OF BINGHAMTON, NEW YORK, A CORPORATION OF NEW YORK

FILM HOLDER FOR CAMERAS

Application filed January 4, 1932. Serial No. 584,726.

My invention relates to a film holder for cameras and particularly to holders such as are generally used in box cameras and known in the trade as "cones". Such cones usually comprise means for removably holding film spools and a substantially flattened cone shaped body portion relatively small at one end where the film passes thereover in position to receive the light and register the image admitted through the front end.

The primary object of my invention lies in the provision of a film holder of this type of all metal construction and in which the body portion is of one piece construction.

Still another object lies in the provision of a novel film guide removably secured to the rear or large end of the body portion.

Still another object of my invention lies in the provision of the general assembly of few parts, economical manufacture and easy assembly.

Other objects and advantages will be apparent as the description proceeds, reference now being had to the figures of the accompanying drawing froming a part of this application and wherein like reference numerals indicate like parts.

In the drawing:

Figure 1 is a perspective view of my improved film holder with the parts in assembled relation.

Figure 2 is a top plan view thereof.

Figure 3 is a rear elevation thereof.

Figure 4 is a detail sectional view taken on the line 4—4 of Figure 2.

Figure 5 is a detail sectional view taken on the line 5—5 of Figure 3.

The reference numeral 1 refers generally to the body portion of the film holder cone, and which as shown, is formed of one piece of material, preferably thin metal, bent to the shape shown in Figure 1 and forming the top 2, the sides 3 and 4, and the bottom 5. The free meeting edges of the metal blank so bent, are folded together on the bottom 5 as at 6 in a manner to rigidly hold the sides in the position shown and to prevent the leakage of light through such joint into the interior of the holder.

Suitably secured to the front end of the side 3, as by the pins or rivets 7, is a spool holding member 8, the ends of which project beyond the upper and lower edges of the side 3. The upper end of the spool holding member 8 is provided with a circular flanged portion 9 of a size adapted to receive one of the flanges 10 of a film spool 11 and provide a journal for such flange.

The lower projecting end of the spool holding member 8 is provided on its inner surface with a spool pin 12 adapted to receive the apertured end of a film spool.

Secured to the side 4, at the front end thereof and directly opposite the spool holding member 8, is a second spool holding member 13 having its ends projecting above and below the side 4 and in alignment with the projecting ends of the spool holder 8.

The lower end of the spool holder 13, is slotted as at 14, to provide a resilient tongue 15 having an inwardly projecting pin 16 thereon in position to engage in the adjacent recessed end of a film spool. Obviously by pushing a spool between the lower projecting ends of the holders 8 and 13, to the right in Figure 1, the resilient tongue 15 will yield sufficiently to permit the opposite end of the spool to be engaged with or disengaged from the pin 12 and thus placed in or removed from the holder.

The upper projecting end of the holder 13 is provided with the usual opening or recess (not shown) through which may pass the usual winding key of the outer camera box, adapted to align with the adjacent end of the spool 11 and thus support the same and provide means for rotating such spool. This construction is well known and has not been illustrated.

Provided upon the top 2 of the holder is a leaf spring 17, the free end of which is adapted to provide tension on the spool 11 and thus prevent inadvertent rotation thereof.

The rear enlarged ends of the sides 3 and 4 are provided adjacent their rear edges with outwardly extending protuberances 18, preferably formed integrally by punching or indenting the material of the sides, and adapted to enter openings 19 formed in metal strips 20, bent as at 21 (see Figure 5) to embrace the rear edges of the sides 3 and 4 and thus be held frictionally and by the protuberances 18, in position as shown in Figures 1 and 3. These strips 20 are bent angularly at 22 on the inner sides of the sides 3 and 4 and inside of the rear edges thereof, as shown clearly in Figure 3, such bent portions 21 providing film guides for the edges of a film which may be positioned from the spool 11 rearwardly over and around the open rear side of the body portion and then forwardly to the spool held by the lower depending ends of the holders 8 and 13. These bent portions 22 of the strips 20 support the edges of the film while the same is positioned over the rear end of the body portion as it moves thereover. The free inner edges of the strips 20 are bent angularly as at 23 so as to be out of the way and leave a smooth shouldered guide for the film edges.

The ends of the strips 20 project above and below the top 1 and bottom 5 as at 24, such projecting ends being offset inwardly so as to lie in substantial alignment with the guide flanges 22 on the inside of the body portion. These extending ends 24 are suitably apertured to receive the trunnions 25 of anti-friction rollers 26 over which the film passes and which prevent scratching of the film as it is drawn around the rear end of the holder and past the exposure station.

It will be obvious from the foregoing that the strips 21 and the rollers 26 form a frame which may be readily assembled and easily and quickly placed into position over the enlarged rear end of the holder, thus providing a film guide over such rear end.

The sides 3 and 4 of the body portion may be provided with outwardly extending protuberances 27 projecting slightly beyond the plane of the strips 20 and serving as centering means for the holder with respect to the inner sides of the camera box within which the holder is inserted.

Of course, changes may be made in details of construction and arrangement of parts without departing from the spirit and scope of my invention. I do not limit myself, therefore, to the exact form herein shown and described other than by the appended claims.

I claim:

1. A film holder for box cameras comprising a flat sided substantially cone shaped member of one piece of material, the free ends of said material being folded together along one side of said material.

2. A film holder for box cameras comprising a flat sided substantially cone shaped member of one piece of material, the free ends of said material being folded together along one side of said material, film spool receiving means secured to said member adjacent the small end thereof, and film guiding means on the large end thereof.

3. A film holder for box cameras comprising a flat sided substantially cone shaped member of one piece of material, the free ends of said material being folded together along one side of said material, film spool receiving means secured to said member adjacent the small end thereof, and film guiding means attached to the large end thereof.

4. A film holder for box cameras comprising a flat sided substantially cone shaped member, film spool receiving means adjacent the small end thereof, and a frame, including film guiding rollers on the opposite end thereof.

5. A film holder for box cameras comprising a flat sided substantially cone shaped member, film spool receiving means adjacent the small end thereof, protuberances on certain sides of said member adjacent the large end thereof, and a frame mounted on said member by means of said protuberances, said frame including film guiding rollers.

In testimony whereof, I affix my signature.

CARL BORNMANN.